(12) United States Patent
Xu et al.

(10) Patent No.: US 10,859,414 B2
(45) Date of Patent: Dec. 8, 2020

(54) MINIATURIZED ILLUMINATED POINTER FOR INSTRUMENT CLUSTER

(71) Applicant: N.S. International, LTD., Troy, MI (US)

(72) Inventors: Sibing Xu, Rochester Hills, MI (US); Anshuman Mittal, Troy, MI (US); Arul Krishna, Farmington Hills, MI (US)

(73) Assignee: N.S. International, Ltd., Troy, MI (US)

( * ) Notice: Subject to any disclaimer, the term of this patent is extended or adjusted under 35 U.S.C. 154(b) by 240 days.

(21) Appl. No.: 15/956,145

(22) Filed: Apr. 18, 2018

(65) Prior Publication Data
US 2019/0323868 A1   Oct. 24, 2019

(51) Int. Cl.
*G01D 13/26*   (2006.01)
*G12B 11/04*   (2006.01)
*G01P 1/08*    (2006.01)
*G01D 11/28*   (2006.01)

(52) U.S. Cl.
CPC .......... *G01D 13/265* (2013.01); *G01D 11/28* (2013.01); *G01P 1/08* (2013.01); *G12B 11/04* (2013.01)

(58) Field of Classification Search
CPC ........ G01D 13/265; G01D 11/28; G01P 1/08; G12B 11/04
See application file for complete search history.

(56) References Cited

U.S. PATENT DOCUMENTS

| 2,089,927 | A | * | 8/1937 | Stechert | F21V 3/04 362/300 |
| 3,559,616 | A |   | 2/1971 | Protzmann et al. | |
| 4,274,358 | A |   | 6/1981 | Nakamura et al. | |
| 4,300,470 | A | * | 11/1981 | Furukawa | G01D 13/22 116/332 |
| 4,625,262 | A | * | 11/1986 | Sakakibara | G01R 1/08 362/23.15 |
| 4,860,170 | A | * | 8/1989 | Sakakibara | G01D 11/28 362/23.15 |
| 4,872,415 | A |   | 10/1989 | Nakadozono et al. | |

(Continued)

FOREIGN PATENT DOCUMENTS

JP   2012-154831   8/2012
KR   10-2001-0027298   4/2001

(Continued)

OTHER PUBLICATIONS

International Search Report and Written Opinion dated Aug. 6, 2019 (Form PCT/ISA/220, 210 and 237); 13 pages.
Translation of JP 2012-154832; Aug. 16, 2012 (30 pages).

*Primary Examiner* — Nimeshkumar D Patel
*Assistant Examiner* — Tania Courson
(74) *Attorney, Agent, or Firm* — Gunther J. Evanina; Butzel Long

(57) ABSTRACT

An illuminable pointer assembly for an instrument panel includes a transparent or translucent base, a transparent or translucent pointer blade, and a hub mounted on the base and supporting the pointer blade. The assembly is miniaturized or capable of being miniaturized by integrating reflectors into a lower surface of the pointer blade to internally reflect light propagated upwardly through the base in a lateral direction to uniformly illuminate the pointer blade.

20 Claims, 7 Drawing Sheets

(56) References Cited

U.S. PATENT DOCUMENTS

| | | | | |
|---|---|---|---|---|
| 5,211,128 A * | 5/1993 | Katoh | ............. | G01D 13/26 116/288 |
| 5,295,047 A * | 3/1994 | Windross | ............. | G01D 11/28 362/23.15 |
| 5,320,062 A * | 6/1994 | Masuda | ............. | B60K 35/00 116/48 |
| 5,458,082 A * | 10/1995 | Cookingham | ............. | G01D 11/28 116/288 |
| 5,703,612 A * | 12/1997 | Salmon | ............. | B60K 37/02 340/815.78 |
| 5,983,827 A * | 11/1999 | Cookingham | ............. | G01D 11/28 116/288 |
| 6,065,846 A * | 5/2000 | Kato | ............. | G01D 11/28 362/23.01 |
| 6,120,158 A * | 9/2000 | Ishimaru | ............. | B60K 35/00 362/23.07 |
| 6,302,552 B1 * | 10/2001 | Ross | ............. | G02B 6/001 116/288 |
| 6,408,784 B1 * | 6/2002 | Ross | ............. | G01D 11/28 116/288 |
| 6,981,464 B2 * | 1/2006 | Birman | ............. | G01D 13/26 116/288 |
| 7,038,975 B2 * | 5/2006 | Ferri | ............. | G04B 19/042 116/288 |
| 7,624,699 B2 * | 12/2009 | Harada | ............. | G01D 13/265 116/286 |
| 7,635,192 B2 * | 12/2009 | Takatsuka | ............. | B60K 37/02 362/23.13 |
| 7,665,413 B2 * | 2/2010 | Birman | ............. | G01D 11/28 116/288 |
| 8,616,147 B2 * | 12/2013 | Wang | ............. | G01D 11/28 116/288 |
| 8,935,989 B2 * | 1/2015 | Cook | ............. | G01D 11/28 116/288 |
| 9,404,772 B2 * | 8/2016 | Sherman | ............. | G01D 13/265 |
| 9,995,606 B2 * | 6/2018 | Miyazawa | ............. | F21V 7/00 |
| 2002/0135995 A1 * | 9/2002 | Fujita | ............. | G01D 11/28 362/23.2 |
| 2004/0004826 A1 * | 1/2004 | Wakaki | ............. | G01D 11/28 362/23.08 |
| 2005/0162843 A1 * | 7/2005 | Lee | ............. | G01D 13/265 362/23.2 |
| 2006/0039130 A1 * | 2/2006 | Takatsuka | ............. | B60K 37/02 362/23.13 |
| 2008/0264328 A1 | 10/2008 | Birman et al. | | |
| 2011/0061586 A1 * | 3/2011 | Wang | ............. | G01D 11/28 116/288 |
| 2015/0151677 A1 * | 6/2015 | Birman | ............. | G01D 13/265 362/23.14 |

FOREIGN PATENT DOCUMENTS

| | | |
|---|---|---|
| KR | 10-2006-0027060 | 3/2006 |
| KR | 10-1518916 | 5/2015 |

* cited by examiner

MINIATURIZED ILLUMINATED POINTER FOR INSTRUMENT CLUSTER

FIELD OF THE DISCLOSURE

This disclosure relates to an illuminated pointer for an instrument panel and more particularly to such pointer having substantially less volume and weight than a conventional illuminated pointer.

BACKGROUND OF THE DISCLOSURE

Shown in FIG. 1 is a conventional illuminated pointer for use in indicating or displaying information, such as to a driver of a vehicle. The conventional pointer assembly 100 includes a base 110, a counterweight 112 for balancing the weight of a pointer blade 114 about the shaft portion 116 of the base, and a hub 118, which acts as a housing to conceal the base, counterweight and proximal end 120 of the blade. In the conventional pointer 100, light propagated toward the blade 114 through base 110 is distributed relatively uniformly along the blade by internal reflectors 122 and 124, which are integrated into the base. The relatively large volume of pointer assembly 100 allows large reflectors 122 and 124 to be used. However, for miniaturized illuminated pointers having a hub diameter less than about 15 millimeters and a volume less than about 1100 cubic millimeters, the challenges associated with the use of reflectors in the base to provide uniform pointer illumination of a suitable intensity become overwhelming.

SUMMARY OF THE DISCLOSURE

In certain aspects of this disclosure, there is a provided a description of an illuminable pointer assembly for an instrument panel having a base including a shaft portion and a disc-shaped portion that is perpendicular to the longitudinal axis of the shaft portion and located at an upper end of the shaft portion, and a pointer blade having a lower surface facing an upper surface of the disc portion of the base. Reflectors are integrally defined at the lower surface of the pointer blade for internally reflecting light propagated upwardly through the base in a lateral direction through the pointer blade.

In certain other aspects of this disclosure, there is provided a description of an illuminable pointer assembly for an instrument panel having a hub including a top and circumferential side wall, the hub being rotatable about its central axis, and a pointer blade having an arm section extending radially away from the hub, a tail section extending opposite the arm section and away from the hub, and a hub section disposed within the circumferential side wall of the hub between the arm section and the tail section. The top of the hub has an elongate opening, and an upper portion of the pointer blade extends through the elongate opening such that there is no gap between the upper portion of the pointer blade and the elongate opening.

DESCRIPTION OF THE ILLUSTRATED EMBODIMENT

Figure 1:
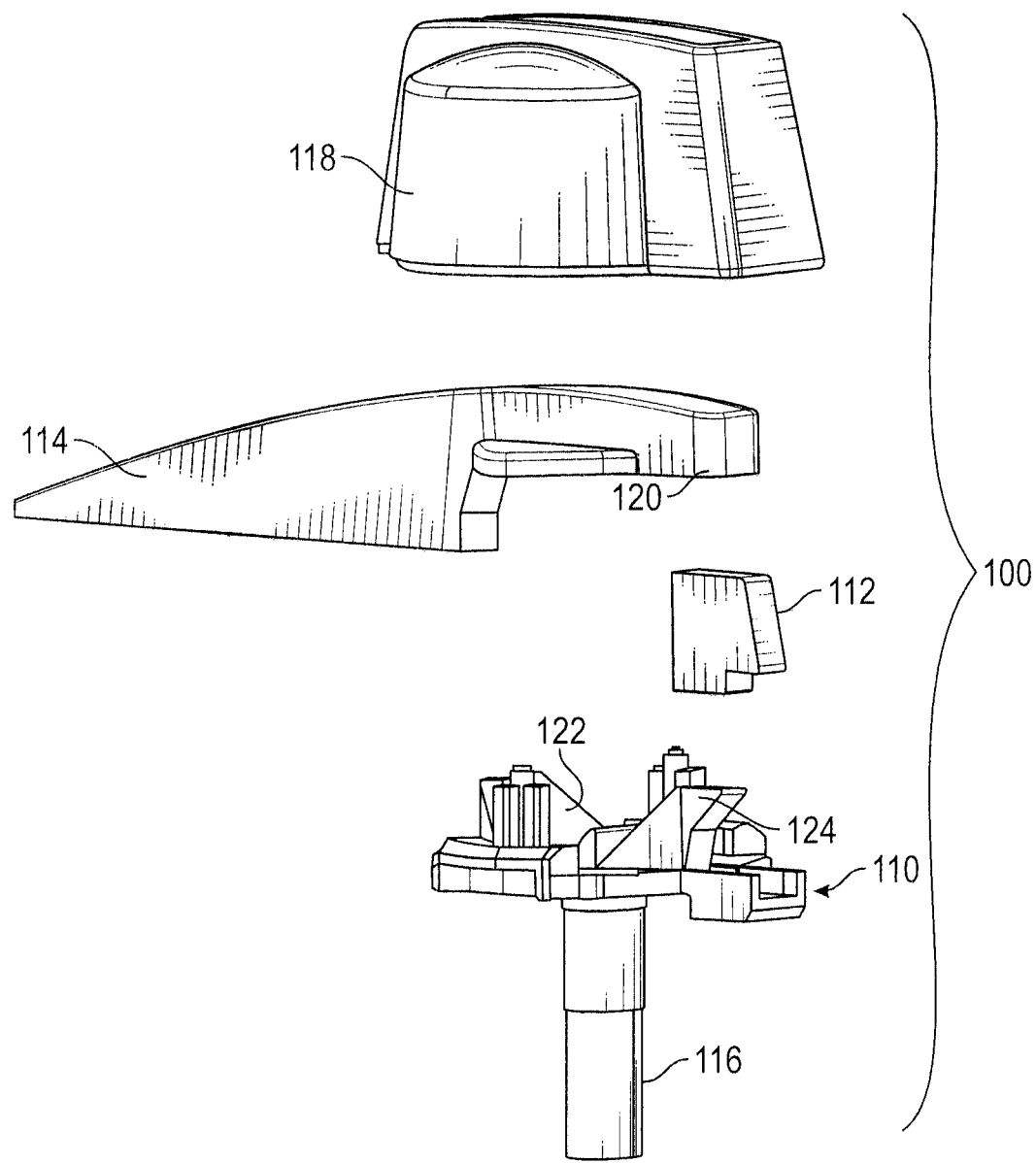
FIG. 1 is an assembly diagram of a conventional illuminated pointer for an instrument panel.
Figure 2:
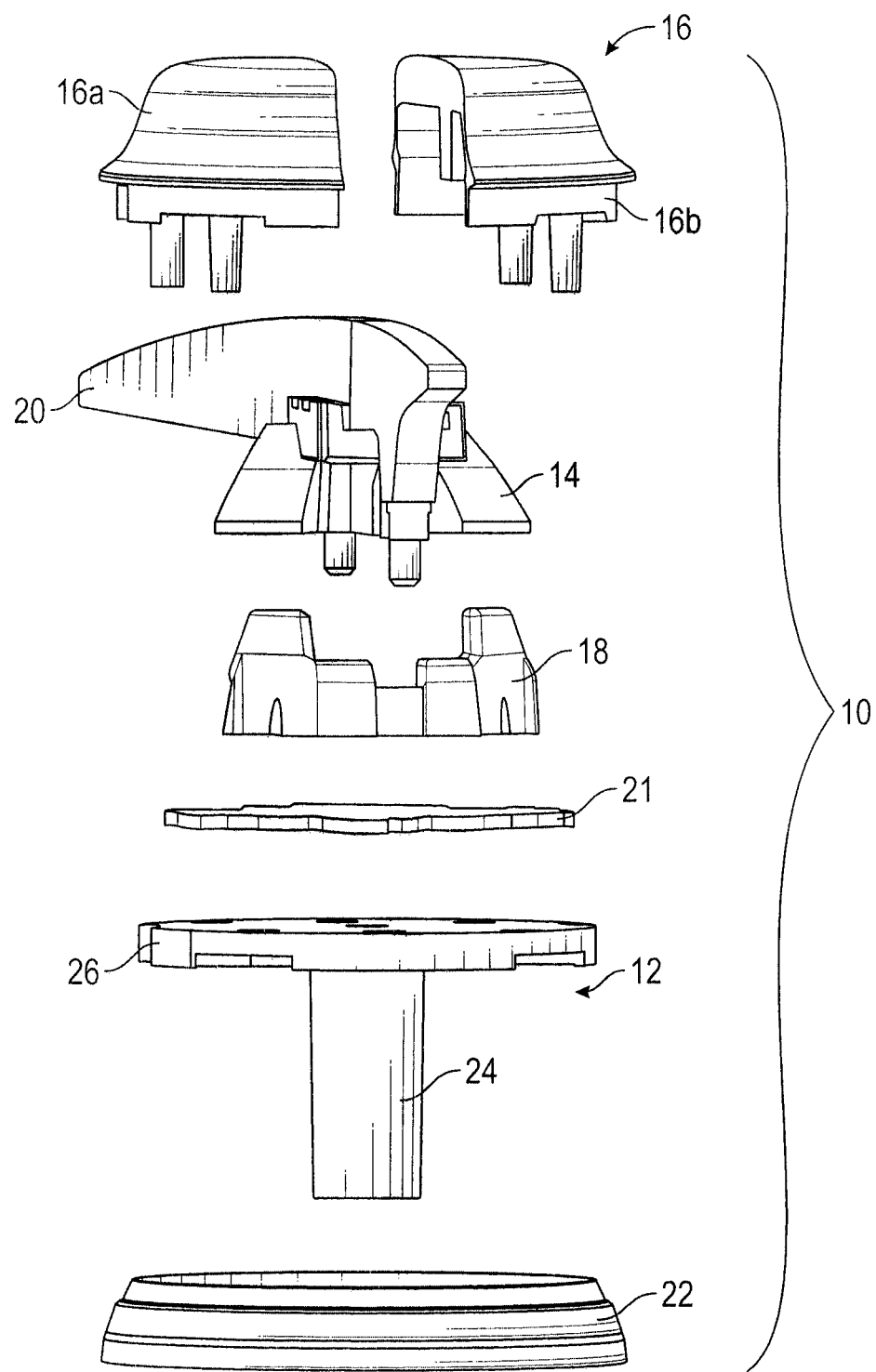
FIG. 2 is an assembly diagram of an illuminable pointer in accordance with this disclosure.

The components of an illuminable pointer assembly 10 are shown in FIG. 2. The assembly comprises a transparent or translucent base 12, a translucent or transparent pointer blade 14, and a hub 16, which, as illustrated in FIG. 2, can be comprised of two pieces 16a, 16b. Desirably, the assembly further comprises a counterweight 18, which balances against the weight of arm 20 of pointer blade 14 to facilitate smooth rotation of the pointer blade. Assembly 10 may also comprise a diffuser 21 that helps evenly distribute light rays propagated upwardly (i.e., in a direction from base 12 toward pointer blade 14) to reduce or eliminate bright and dark spots on pointer blade 14. The disclosed assembly 10 may also comprise a decorative ring 22, which may be comprised or made of a metal, such as an alloy of chromium.

Base 12 includes a shaft portion 24 and a disc-shaped portion 26 that is located at an upper end (i.e., end nearest blade 14) of the shaft portion. Disc portion 26 is centered with the shaft portion 24 and is arranged perpendicular to the longitudinal axis of the shaft portion.

A light source (not shown) is positioned below or behind an instrument panel (not shown) on which assembly 10 is mounted, such that light from the source is propagated upwardly through base 12 in a direction generally parallel with the longitudinal axis of shaft portion 24 of the base. Base 12 is preferably transparent (i.e., transmits light with very little or no image distortion), although base 12 could be semi-transparent or translucent (i.e., light is diffused or transmitted with some distortion of image).

Pointer blade 14 is also comprised or made of a transparent or translucent material, such that light from the source can be reflected and distributed relatively uniformly throughout blade 14.

Figure 3:
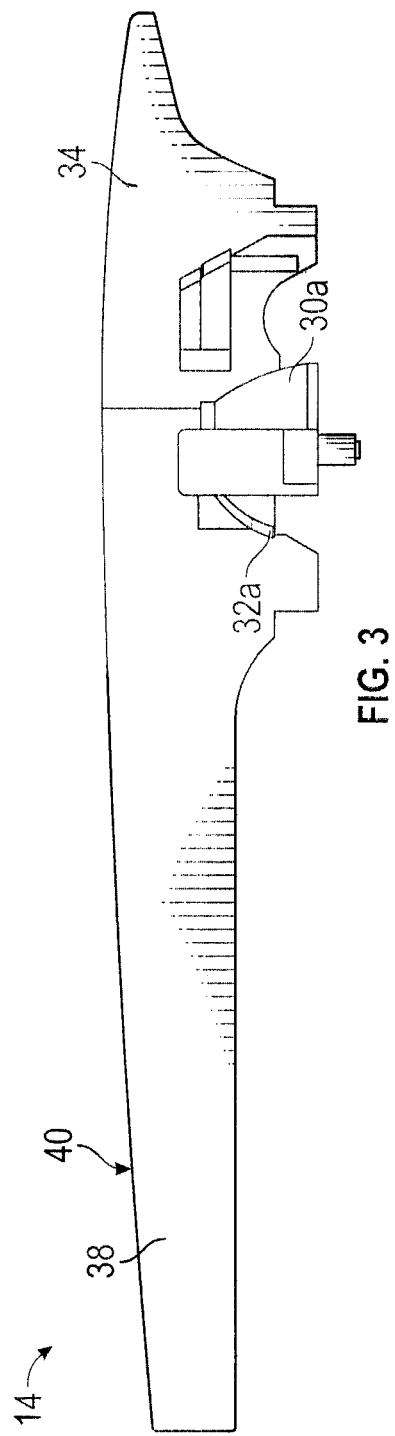
FIG. 3 is a side elevational view of a pointer blade in accordance with this disclosure.
Figure 4:
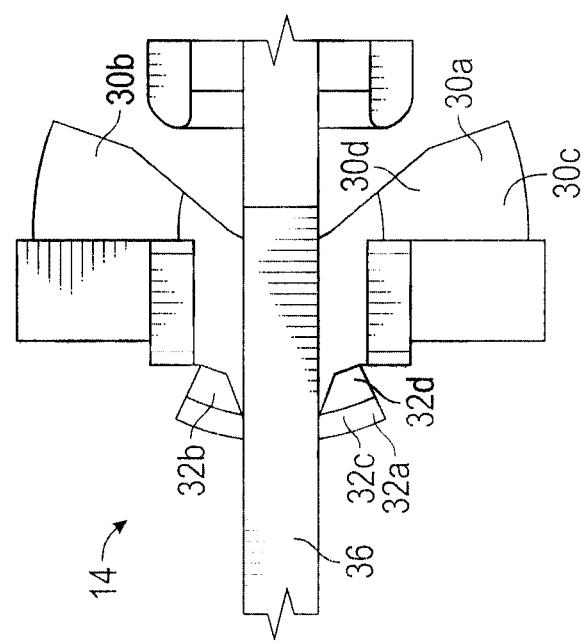
FIG. 4 is a bottom view of a pointer blade in accordance with this disclosure.

As illustrated in FIGS. 3 and 4, blade 14 is provided with integral (e.g., integrally formed) reflectors 30a, 30b, 32a, and 32b. Smaller reflectors 32a and 32b receive light that propagates upwardly from the source and through base 12. Reflectors 32a and 32b include facets 32c and 32d that internally reflect (i.e., reflect back through the reflector optic elements 32a and 32b) light toward a tail section 34 of blade 14 (such as indicated by light ray 36). Larger reflectors 30a and 30b receive light from the source and include facets 30c and 30d that internally reflect light toward an arm section 38 of blade 14. Unlike conventional illuminable pointer assemblies in which reflectors are provided either on the base or on an upper surface of the pointer blade, the reflectors of the illustrated assembly 10 are integrated into a lower surface of blade 14. This allows a more compact or miniaturized design and facilitates complete exposure of a smooth upper surface 40 of blade 14. The illustrated design facilitates a hub volume less than 1000 cubic millimeters, less than 750 cubic millimeters, or even less than 500 cubic millimeters, whereas conventional designs generally require a hub volume of at least 1100 or 1200 cubic millimeters. The reflectors 30a and 30b have a maximum dimension or length that is less than 5 millimeters or even less than 3 millimeters. Reflectors 32a and 32b have a maximum dimension or length that is less than 3 millimeters, less than 2 millimeters, or even less than 1.5 millimeters. Preferably, blade 14 is symmetrical with respect to a plane (perpendicular to the sheet on which blade 14 is illustrated in FIG. 4), and reflectors 32a and 32b, and reflectors 30a and 30b, are located on opposite sides of this plane.

Figure 5:
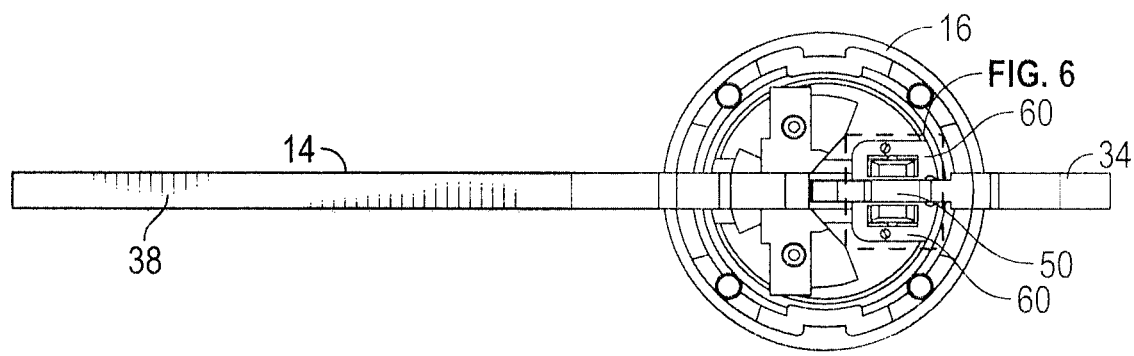
FIG. 5 is a bottom view of a pointer blade attached to a hub in accordance with this disclosure.
Figure 6:
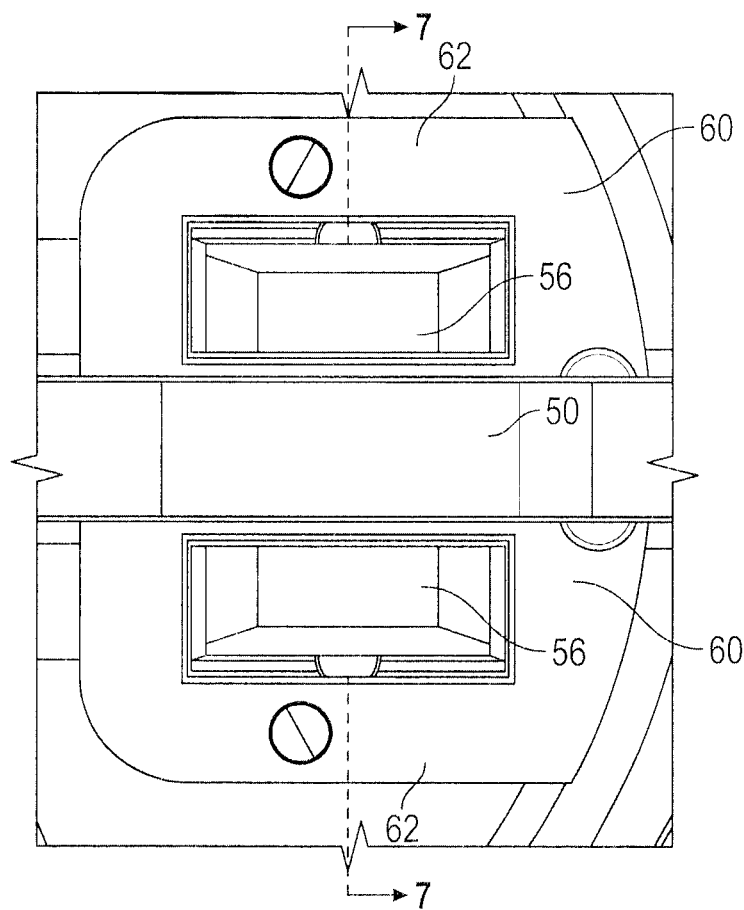
FIG. 6 is an enlarged bottom view of the area of attachment of the pointer blade to the hub.
Figure 7:
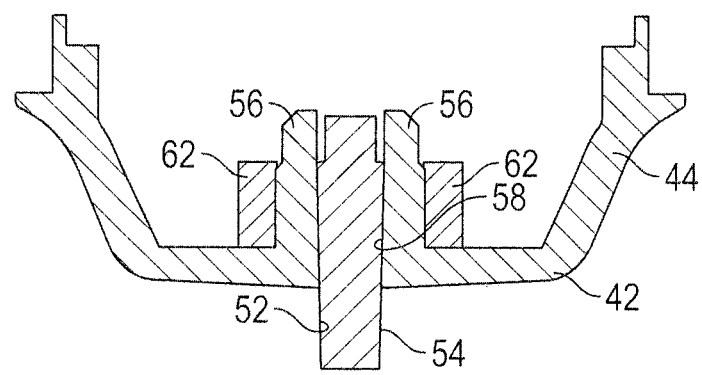
FIG. 7 is a section view along lines A-A of FIG. 6.

FIGS. 5-7 illustrate a preferred structure for securing blade 14 to hub 16. Hub 16 has a top wall 42 and a circumferential side wall 44 that together define a generally cup-shaped structure that is rotatable with blade 14 about an axis coincident with the central longitudinal axis of the shaft portion 24 of base 12. In the assembled state shown in FIG. 5, blade 14 is secured to hub 16, and includes an arm section 38 that extends radially away from hub 16 in a first direction and a tail section 34 that extends radially away from the hub in a direction opposite (180° from) the first direction. Between the arm section and tail section, and disposed within the circumferential wall 44 of hub 16 is a hub section 50 of blade 14. Top wall 42 of hub 16 has an elongate opening 52 through which an upper end 54 of blade 14 protrudes away from top 42. Hub 16 and blade 14 are configured such that there is no gap between the upper portion 54 of blade 14 and the edges of opening 52.

The elimination of gaps between the hub 16 and blade 14 can be achieved, or advanced, by providing hub 16 with ribs 56 extending perpendicularly from top wall 42 adjacent opposite elongate sides of the elongate opening to engage opposite surfaces of a lower portion 58 of blade 14, and by including retainer loops 60 on opposite sides of the hub section 50 of blade 14. Loops 60 engage sides of ribs 56 opposite sides of the ribs engaging the lower portion of blade 14. Preferably, loops 60 are configured to provide an interference fit such that loops 60 have an outer leg 62 that is resiliently biased toward ribs 56 urging ribs 56 against blade 14 to reduce or eliminate gaps between the blade and hub. A suitable interference (i.e., the extent to which ribs 56 and/or legs 62 must be deflected) is from about 0.05 to 0.15 millimeters, or about 0.1 millimeters.

As can be seen by referenced to FIG. 7, the hub section 50 of the blade 14 and the distance between the ribs 56 are tapered, such that the blade is wedged into the elongate opening 58.

The illustrated arrangement enables pointer blade 14 to be supported only by hub 16, such that blade 14 does not contact any other component of the pointer assembly 10.

Figure 8:
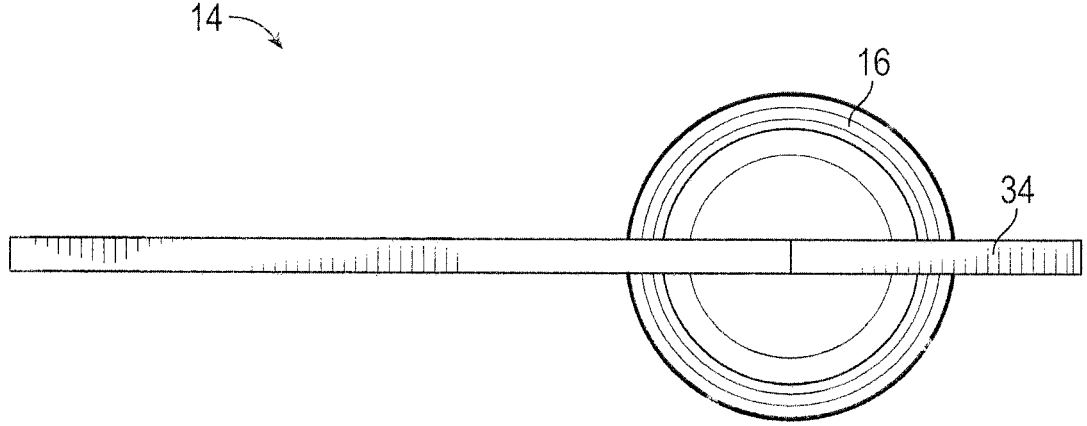
FIG. 8 is a top view of the pointer blade and hub shown in FIGS. 5-7.

As can be seen by referenced to FIG. 8, the design of pointer assembly 10 allows the entire upper surface of blade 14 to be visually exposed and illuminated.

Figure 9:
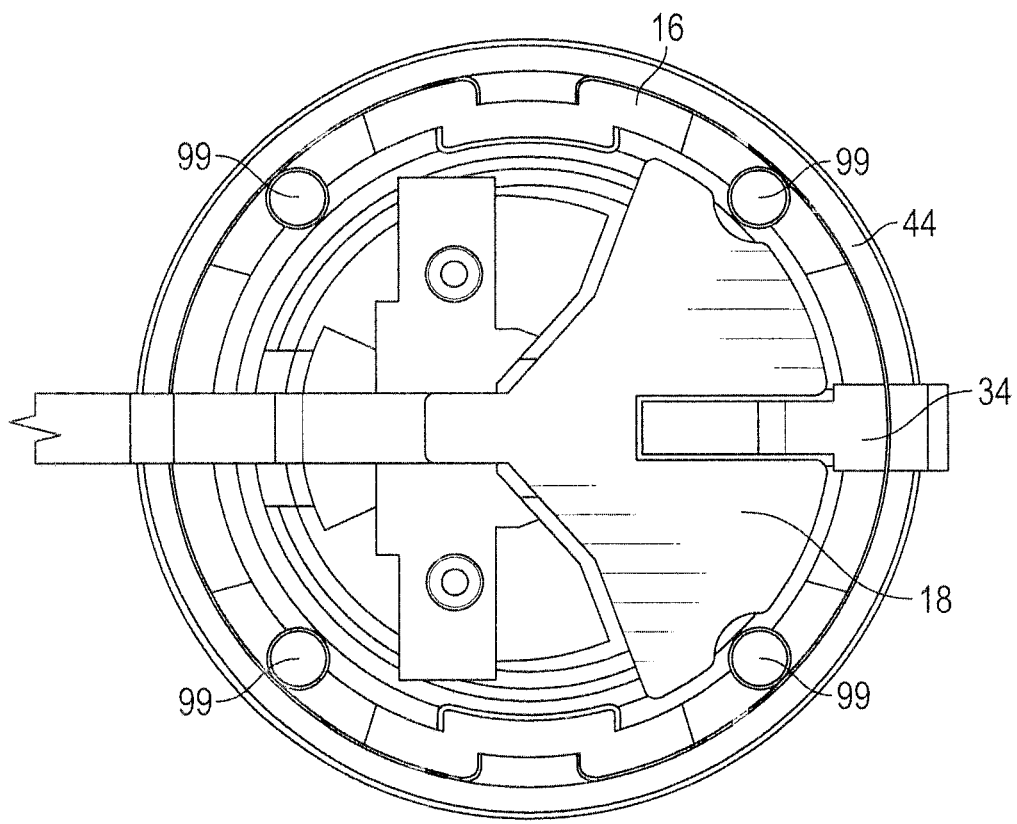
FIG. 9 is a bottom view of the pointer blade and hub shown in FIGS. 5-8 with a counterweight added to the assembly.

As illustrated in FIG. 9, a counterweight 18 is located adjacent tail section 34 to balance the pointer and hub for smooth rotation about a central axis through hub 16. Counterweight 18 is disposed entirely within hub 16. This allows the width of the shorter tail section 34 and the width of the longer arm section 38 to be the same while maintaining a balanced weight distribution of the assembly around the rotational axis.

Figure 10:
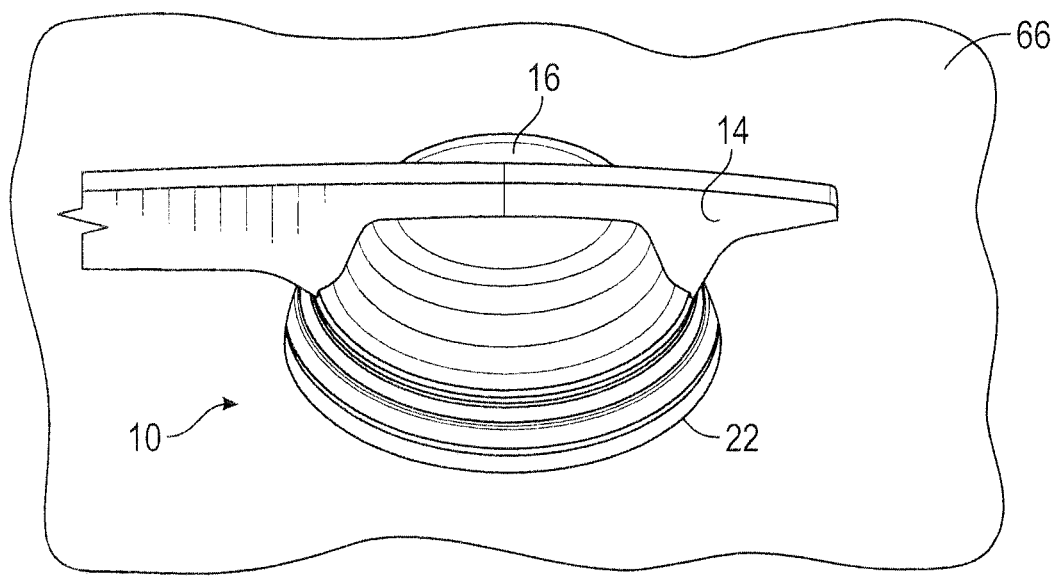
FIG. 10 is a perspective view of a completely assembled illuminable pointer assembly.

The compact or miniaturized assembly of this disclosure facilitates addition of a decorative ring 22 (FIG. 10) disposed between the outer periphery of hub 16 and an instrument panel 66.

Figure 11:
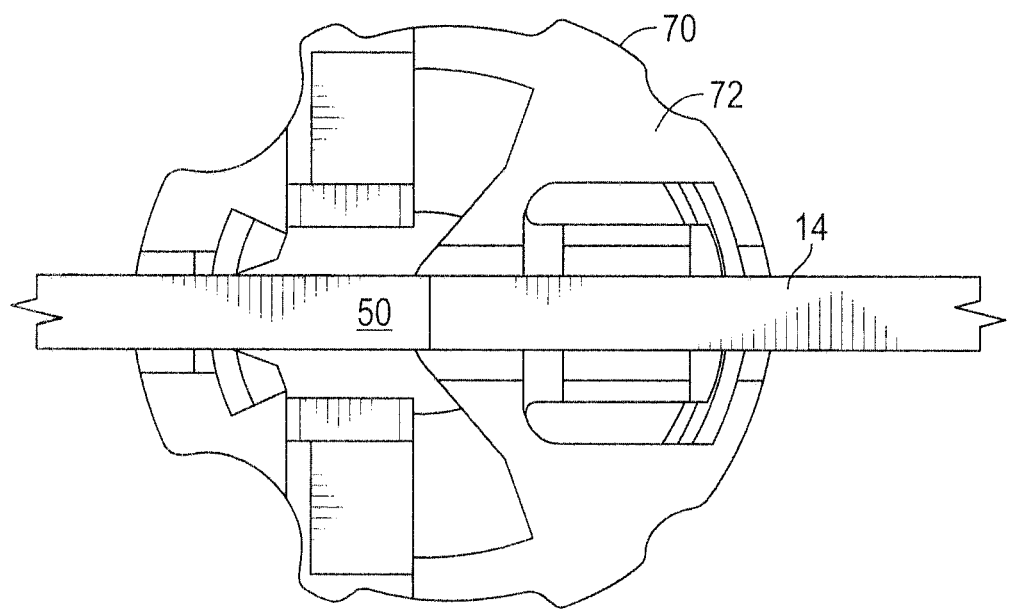
FIG. 11 is an enlarged bottom view of a hub section of the pointer blade indicating the overlay position of a light diffusion.
Figure 12:
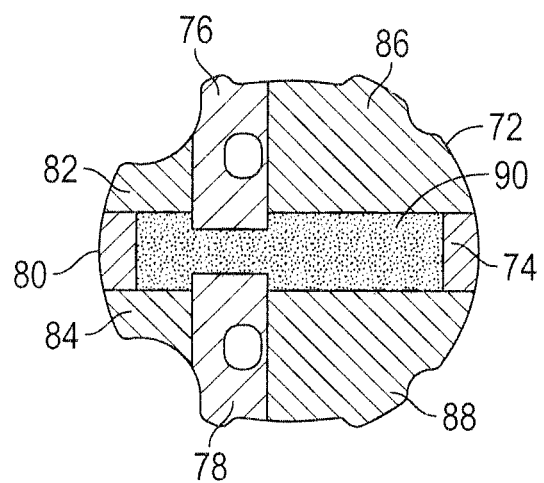
FIG. 12 is a bottom view of the light diffuser.

FIG. 11 shows the outline 70 of a diffuser sheet 72 overlaying the hub section 50 of blade 14. Diffuser sheet 72 is provided and designed to achieve uniform lighting in a miniaturized illuminable pointer assembly 10 using very small reflectors 30a, 30b, 32a, 32b integrated into the lower surface of blade 14. It has been found that diffuser sheet 72 eliminates or very substantially reduces hot spots and dark spots along the length of the pointer blade, which otherwise occur in such miniaturized assembly. Diffuser sheet 72 includes opaque areas (74, 76, 78, 80), transparent or clear areas (82, 84, 86, 88), and a light-scattering diffuser area 90 that is positioned directly between the light source and under the reflectors 30a, 30b, 32a and 32b of blade 14, and which diffuses or evenly spreads light to the reflectors.

As shown in FIG. 9, hub 16 can be provided with a plurality of heat stakes pins 100 adjacent circumferential side wall 44 for securing assembly 10 to an instrument panel.

Accordingly, it is to be understood that the above description is intended to be illustrative and not restrictive. Many embodiments and applications other than the examples provided would be apparent upon reading the above description. The scope of the invention should be determined with reference to the appended claims along with the full scope of equivalents to which such claims are entitled. It is anticipated and intended that future developments will occur, and that the disclosed systems and methods will be incorporated into such future embodiments. In summary, it should be understood that the invention is capable of modification and variation.

What is claimed is:

1. An illuminable pointer assembly for an instrument panel, comprising:
    a base having a transparent or translucent shaft portion and an integral transparent or translucent disc portion that is perpendicular to the shaft portion and located at an upper end of the shaft portion;
    a transparent or translucent pointer blade having a lower surface facing an upper surface of the disc portion of the base; and
    reflectors integrally defined at the lower surface of the pointer blade for internally reflecting light propagated upwardly through the base in a lateral direction through the pointer blade.

2. The pointer assembly of claim 1, wherein the pointer blade includes an arm section extending radially away from the shaft portion of the base and a shorter tail section extending opposite the arm section, and wherein the reflectors include at least one reflector for reflecting light into the arm section and at least one reflector for reflecting light into the tail section.

3. The pointer assembly of claim 1, wherein the pointer blade has a plane of symmetry in which a central axis of the shaft portion of the base is located, and wherein an arm reflector is located on each side of the plane of symmetry for reflecting light into an arm section of the pointer blade that extends radially away from the shaft portion of the base, and a tail reflector is located on each side of the plane of symmetry for reflecting light into a tail section of the pointer blade that extends opposite of the arm section.

4. The pointer assembly of claim 1, wherein the length of the reflectors is less than 5 millimeters.

5. The pointer assembly of claim 1, wherein the reflectors have at least two reflective surfaces.

6. An illuminable pointer assembly of claim 1, further comprising
a hub having a top and circumferential side wall, the hub rotatable about a central axis of the hub; and wherein the pointer blade has an arm section extending radially away from the hub, a tail section extending opposite the arm section away from the hub, and a hub section disposed within the circumferential side wall of the hub between the arm section and the tail section; and
wherein the top of the hub has an elongate opening, and an upper portion of the pointer blade extends through the elongate opening such that there is no gap between the upper portion of the pointer blade and the elongate opening.

7. The pointer assembly of claim 6, wherein the hub includes ribs extending perpendicularly from the top of the hub adjacent opposite elongate sides of the elongate opening to engage opposite surfaces of a lower portion of the pointer blade.

8. The pointer assembly of claim 7, wherein the pointer blade includes retainer loops that engage sides of the ribs opposite sides of the ribs engaging the lower portion of the pointer blade.

9. The pointer assembly of claim 8, wherein the retainer loops and ribs are configured to provide an interference fit.

10. The pointer assembly of claim 9, wherein the interference between the retainer loops and the ribs are from 0.05 to 0.15 millimeters.

11. The pointer assembly of claim 7, wherein the hub section of the pointer blade and distance between the ribs are tapered, whereby the pointer blade is wedged into the elongate opening.

12. The pointer assembly of claim 6, wherein the pointer blade is supported entirely by the hub and does not contact any other component of the pointer assembly.

13. The pointer assembly of claim 6, wherein a counterweight is located adjacent the tail section of the pointer blade to balance the pointer and hub for rotation about a central axis through the hub.

14. The pointer assembly of claim 13, wherein the counterweight is located entirely within the hub, and the width dimension of the arm section and tail section of the pointer blade are the same.

15. The pointer assembly of claim 6, further comprising a decorative ring disposed between the outer periphery of the hub and an instrument panel.

16. The pointer assembly of claim 6, further comprising a light diffuser positioned between the hub and a base.

17. The pointer assembly of claim 6, wherein the volume of the hub is less than 1000 cubic millimeters.

18. The pointer assembly of claim 6, wherein the hub further comprises a plurality of heat stake pins adjacent the circumferential side wall for securing the pointer assembly to an instrument panel.

19. The pointer assembly of claim 1, further comprising an illuminable pointer assembly for an instrument panel, comprising:
a diffuser sheet including a light-scattering diffuser area disposed between the disc potion of the base and the pointer blade.

20. The pointer assembly of claim 19, wherein the pointer blade has a lower surface facing an upper surface of the disc portion of the base, and reflectors integrally defined at the lower surface of the pointer blade for internally reflecting light propagated upwardly through the base in a lateral direction through the pointer blade, and wherein the diffuser area is located directly under the reflectors.

\* \* \* \* \*